United States Patent [19]
Koenig et al.

[11] Patent Number: 5,923,102
[45] Date of Patent: Jul. 13, 1999

[54] AUTOMATIC SUB-FLOOR PUMPING SYSTEM

[75] Inventors: Robert H. Koenig, Burdett, N.Y.; Richard E. Koenig, Rocheport, Mo.

[73] Assignee: Avcheck Corporation, Burdett, N.Y.

[21] Appl. No.: 09/062,845

[22] Filed: Apr. 20, 1998

[51] Int. Cl.$^6$ ............................................. H01H 35/18
[52] U.S. Cl. ................... 307/118; 73/304 R; 340/618; 340/620; 417/19; 417/279
[58] Field of Search ............................. 307/118; 340/602, 340/604, 618, 620; 361/178; 417/19, 20, 279; 73/53.04, 304 R

[56] References Cited

U.S. PATENT DOCUMENTS

| | | |
|---|---|---|
| 820,429 | 5/1906 | May . |
| 821,623 | 5/1906 | Edison . |
| 1,979,127 | 10/1934 | Warrick .................................... 175/335 |
| 3,337,778 | 8/1967 | Becker ...................................... 317/149 |
| 3,787,733 | 1/1974 | Peters ....................................... 307/118 |
| 3,894,240 | 7/1975 | Rose .......................................... 250/577 |
| 3,916,213 | 10/1975 | Luteran .................................... 307/118 |
| 4,061,442 | 12/1977 | Clark ........................................ 417/36 |
| 4,182,363 | 1/1980 | Fuller ........................................ 137/392 |
| 4,550,261 | 10/1985 | Hormel et al. ........................... 307/118 |
| 4,600,844 | 7/1986 | Atkins ....................................... 307/118 |
| 4,678,403 | 7/1987 | Rudy et al. ............................... 307/118 |
| 4,742,244 | 5/1988 | Koerner .................................... 307/118 |
| 5,216,288 | 6/1993 | Greene ...................................... 307/118 |
| 5,247,710 | 9/1993 | Carder et al. ............................ 307/118 |
| 5,408,223 | 4/1995 | Guillemot ................................. 340/620 |

*Primary Examiner*—Albert W. Paladini
*Attorney, Agent, or Firm*—Brown, Pinnisi & Michaels, P.C.

[57] ABSTRACT

An automatic sub-floor pumping system, having a controller box, sensor wires, suction hose and pump. Two or three sensor probes are used—the lowest, or ground, probe can be omitted, and the circuit referenced to earth or wiring ground. The pump evacuates water from beneath the basement floor through a hose inserted into a small hole drilled into the basement floor. The sensor probes can be simply wires with the last ⅛" to ½" bared, attached to the outside of the pump suction hose at two locations an inch or two apart. The hose, with wires attached, is inserted down the one-inch evacuation hole bored through the floor. The control uses a very low current on the wires, which are negative relative to ground so as to be cathodically protected from corrosion. An optional sensing circuit monitors lower probe wire voltage and warns of possible corrosion effects.

13 Claims, 3 Drawing Sheets

AUTOMATIC SUB-FLOOR PUMPING SYSTEM

FIELD OF THE INVENTION

The invention pertains to the field of controls for pumps. More particularly, the invention pertains to control apparatus for drain pumps used in basements and the like.

BACKGROUND OF THE INVENTION

The present invention is the result of diligent and successful work in eliminating periods of water in the basement. In past years there would be surprise and dismay to find several inches of water over the basement floor. Frantic effort would be required to undo the damage.

Conventionally a pump is placed in a cavity ("sump") or well cut into the floor in or below the gravel/rock bed which is found under basement floors. A float attached to the sump pump, or a separate float switch, moves a mechanical switch to activate the pump whenever the water level in the sump rises far enough. A direct float-actuated switch arrangement can cause frequent cycling of the pump motor, shortening its life, so precautions need to be made to ensure the pump runs for a moderate amount of time after actuation.

Float control is prone to problems due to mechanical interference with the float mechanism. Hoses or debris in the water can hold the float under water, preventing it from turning on the pump, or such objects can slip under the float, causing the pump motor to run continuously. Corrosion on the float hinge or slip rod can cause the float to hang up. The float itself requires clear space around the float, especially for a hinged float, increasing the required sump size. In addition, the water level is not well controlled, and the process of floatation requires a certain amount of water to physically support the float sufficiently to activate a switch. In short, float switches are subject to jamming, require much space, and need wide water height variations.

The drawbacks of float usage have been addressed in the past, with the use of direct sensing of water level by electrodes dating back as far as 1906 in other applications (filling of steam vessels or batteries, for example)—see U.S. Pat. No. 820,429 "APPARATUS FOR ASCERTAINING THE LEVEL OF LIQUIDS", issued to Charles May or U.S. Pat. No. 821,623 "STORAGE BATTERY FILLING APPARATUS", issued to Thomas Edison. Not long after, electrode-sensing was applied to emptying of sumps. The following U.S. Patents use an electrode-controlled sump pump:

U.S. Pat. No. 1,979,127 "ELECTRICAL CONTROL DEVICE" issued to Charles Warrick in 1934. This purely electromechanical equivalent of control system of invention, shown in a sump pump-like application has three probes driving a special two-coil relay. The use of relays requires relatively high current, which results in accelerated corrosion, and the custom mechanical relay is both expensive and troublesome by today's standards.

U.S. Pat. No. 2,202,197 "GAUGE AND CONTROL APPARATUS FOR LIQUID CONTAINERS", issued to Gordon Ewertz in 1940 uses five probes (including a ground probe), with switches to control either filling or emptying of tank. The control element is a vacuum tube.

U.S. Pat. No. 3,337,778 "RELAY APPARATUS" issued to Lester Becker in 1967 is a general patent on the use of thyratrons to control relays. The embodiment of FIGS. 5–8 uses the thyratron circuit with three probes in a sump to control a sump pump.

U.S. Pat. No. 3,787,733 "LIQUID LEVEL CONTROL SYSTEM" issued to Tony Peters in 1974 is a sump pump control using two active electrodes (high and low level), with the sump lining being the ground. A Triac is used as the control element.

U.S. Pat. No. 3,894,240 "CONTROL CIRCUIT FOR MAINTAINING A MOVABLE MEDIUM BETWEEN LIMITS" issued to Ronald Rose [Simer Pump Co] in 1975 is a sump pump control using two probes (again, the ground is the sump lining). This patent uses a neon lamp and photosensor to provide high on/low off function.

U.S. Pat. No. 3,916,213 "LIQUID LEVEL CONTROLLER" issued to Frank Luteran in 1975 is another sump pump using two probes, plus power-line ground, for high on/low off control. The control element is an SCR. AC current is used in the probes.

U.S. Pat. No. 4,061,442 "SYSTEM AND METHOD FOR MAINTAINING A LIQUID LEVEL" issued to Anthony Clark [Beckett Corp] in 1977 is a sump pump or air conditioner condensate tank pump control. Four probes are used—ground plus three active probes—high, low and alarm (shuts off a/c or heating system). This patent uses a low voltage high frequency signal on probes.

U.S. Pat. No. 4,182,363 "LIQUID LEVEL CONTROLLER" issued to Mark Fuller in 1980, uses four probes (ground, high, low, alarm) and CMOS logic circuitry to control a pump for filling (rather than emptying) a vessel. The design of the probes is such as to minimize false returns due to waves or splashing (not a concern in the present invention).

U.S. Pat. No. 4,600,844 "LIQUID LEVEL CONTROL APPARATUS" issued to Donald Atkins [Marley-Wylain Co] in 1986 is a two probe (high/low) sump pump system, referenced to earth ground. Two comparators are used to sense probe current, with an IC OR gate driving a photoisolator to control the pump.

U.S. Pat. No. 4,742,244 "ELECTRONIC FLOAT SWITCH APPARATUS" issued to Charles Koerner [ITT Avionics] in 1988 uses two (high/low) probes. An oscillator applies an AC signal to each probe, and the AC signal is detected and used to drive the controller logic. When the probe is submerged, the oscillator stops oscillating.

U.S. Pat. No. 5,216,288 WATER LEVEL CONTROL CIRCUIT FOR SUMP PUMPS AND THE LIKE issued to James Greene [Marley co.] in 1993 uses comparator sensors connected to high/low probes. The comparators drive an SCR to operate the pump motor in a sump pump application.

U.S. Pat. No. 5,408,223 "DEVICE FOR DETECTING TWO LEVELS OF A LIQUID HAVING HIGH AND LOW ELECTRODES OF METALS OF DIFFERENT ELECTRODE POTENTIALS WHICH ARE CONNECTED BY CONDUCTORS SO AS TO FORM AN ELECTRICAL PRIMARY CELL" issued to Gilbert Guillemot in 1995, uses two probes but just one wire—differing metals between the two probes produce differing voltages, which are sensed to control a sump pump.

A major concern with electric probe water sensing is corrosion and contamination, which, from literature on the subject and from testing, has two origins: (a) ordinary environmental corrosion and deposition of contamination such as algae, lime and the like; and (b) electrolysis corrosion due to the sensing current.

The use of a sump, in general, introduces a relatively large pit which is usually partially filled with water, which adds to the humidity problems already present in the basement. This is eliminated through the use of the present invention.

Some additional advantages of the invention over commonly used methods are simplicity of installation, overall cost reduction, less disruption of basement floor space and better control of sub-floor water levels.

SUMMARY OF THE INVENTION

The invention, comprising a controller box, sensor wires, suction hose and pump, has kept the inventor's basement totally dry for several years through extremely wet spells. The invention works with a single one-inch hole which can be easily drilled into any concrete floor to accommodate both the evacuation hose and the sensor wires, eliminating the need for a large sump. This invention is suitable for a homeowner to install in one morning or one afternoon using an impulse drill and masonry bit which can be rented. As water is evacuated from under the floor, the water level lowers under the entire floor, (and no water pressure exerts on the floor to cause a wet basement). The inventor's home had a gravel bed under the floor, but the invention is also applicable to homes with earth beds, as is discussed in the detailed description, below.

Two or three sensor probes are used—the lowest, or ground, probe can be omitted, and the circuit referenced to earth or wiring ground. The sensor probes can be simply wires with the last ⅛" to ½" bared, attached to the outside of the pump hose with bared tips at two locations approximately an inch apart. The hose, with wires attached, is inserted down the one-inch evacuation hole bored in the floor.

The control uses a very low current on the wires, which are negative relative to ground so as to be cathodically protected from corrosion. A part of the invention consists of an optional sensing circuit which monitors lower probe wire voltage and warns of possible corrosion effects.

DESCRIPTION OF THE PREFERRED EMBODIMENT

Figure 1:
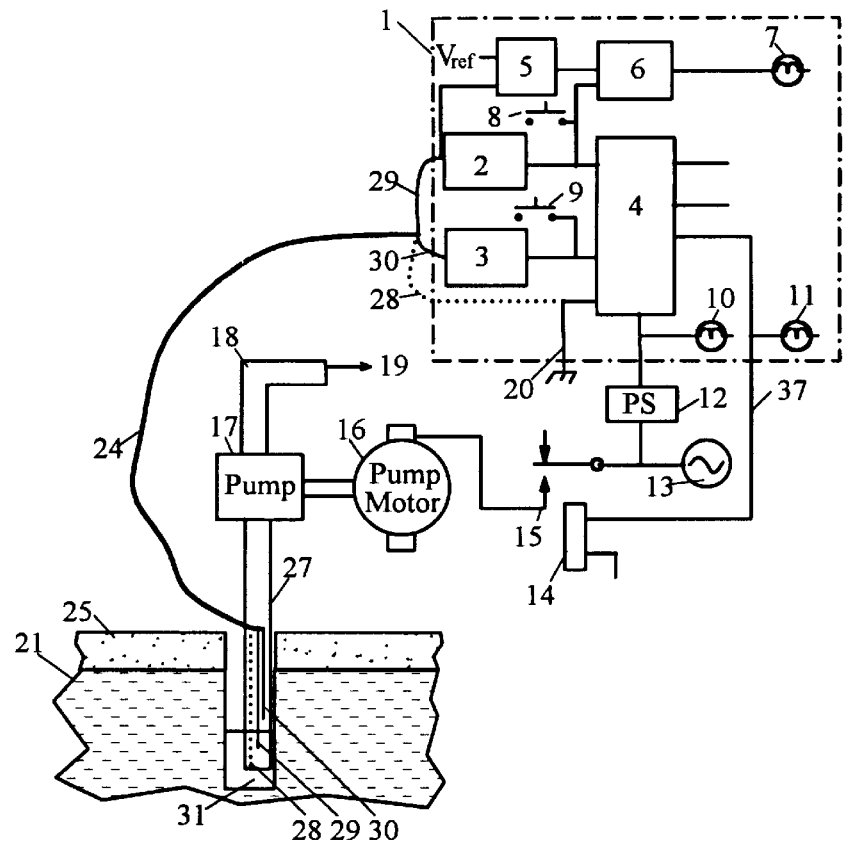
FIG. 1 shows a block diagram of the invention.
Figure 2:
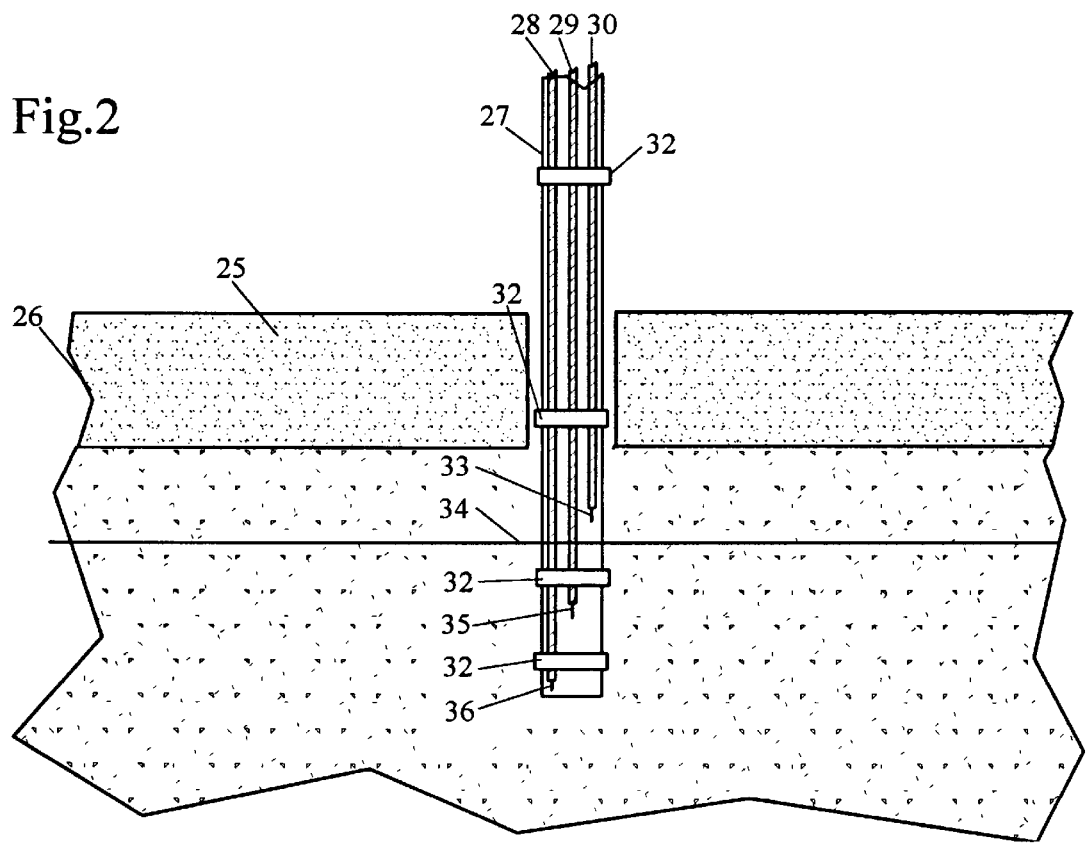
FIG. 2 shows a close-up of the sensor arrangement of the invention, in use in a basement sub-floor bore.

Referring to the block diagram of FIGS. 1 and 2, the under-floor pump control system of the invention uses a pump (17), driven by an electric pump motor (16) to pump water from under the basement floor (25) through a hose (27) inserted through a hole (31) bored through the concrete basement floor (25) and into the under-floor gravel bed (26).

Either a gravel or earth bed will be found under a basement floor, and these call for slightly different treatment. The gravel bed has been standard good practice for over two decades, and is ideal for use with the invention, because the water level is uniform under the entire floor. This allows the level to be readily controlled by the hose with sensors several inches below the floor. FIG. 2 shows the gravel bed sectional view.

If earth or mud (21) is found under the floor, a deeper hole (31), approximately one foot deep, should be made, forming a kind of well from which the water is removed. This relieves the hydrostatic pressure and basement water invasion. With an earth bed, a smaller pump would be used which would run for longer periods. The floor section of FIG. 1 shows the earth bed situation.

It will be understood that the present invention may be used in either gravel-or earth-bed situations, and the explanations below would apply to either.

The water pumped out of the hose is pumped into a drain hose (18) and thus out (19) of the basement, into a dry well, storm sewer or the like. The hole (31) can be as small as one inch in diameter, and the hose needs to reach as little as three inches deep under the floor slab (25). Hose (27) can be protected from incoming pebbles or other debris by a screen on the bottom end.

The pump (17) recommended with this invention is a utility pump (or sprinkler pump), or may be a solid-state plunger pump developed as a fuel pump. These may be placed on the floor (25) or on a flat plank near the drilled hole (31). The pump may also be an existing sump pump, with the float bypassed. Sump pumps which are in existing installations (as well as in new installations) may also be used with this invention to give the following benefits: (a) more accurate control of the water levels; or (b) replace an inoperative float switch; or (c) control water levels with a sump pump having no float switch.

As can be seen in more detail in FIG. 2, the hose (27) has a number of insulated sensing wires (28), (29) and (30) attached, so that the wires are carried down the hole (31) with the hose (27). The wires can be attached along the length of the hose (27) with tape or heat-shrinkable tubing (32) placed at intervals, or could be spiraled around the hose and fastened with adhesive or by heat bonding. At a minimum, the invention requires two sensing wires (29) and (30), with the third, lowest wire (28) being optional as discussed below. The end of each wire (33), (35) and (36) is bare, having the insulation stripped back ¼ to ½ inch. It should be noted that the sensing wires could be separate from the hose, and could be inserted in a separate hole in the gravel below the basement floor, but the described method offers greater simplicity.

The design of the present invention, through the use of a number of features, eliminates the usual objections to the use of electric probe water sensing—corrosion and contamination. Therefore, ordinary copper sensing wire can be used. These features, to be discussed in more detail below, are:

a. Cathodic protection—the probes are negative relative to the water;

b. Low current—preferably on the order of a microampere; and c. Providing a warning of the presence of resistance on the lower sensing probe, flashing the "WET" indicator so the homeowner is prompted to remove and wipe the probe ends clean.

The optional lowest wire (28), termed a "ground wire", has its stripped end (36) close to the end of the hose (27) so that it is usually submerged when water is present. This wire (28) establishes a ground reference for the control circuit of the invention, but can be omitted in favor of an earth ground or wiring ground connection (20).

The stripped end (35) of the middle wire (29) in FIG. 2, termed the "lower probe", establishes the lowest point to which the water in the hole (31) will be pumped. It may be placed preferably, slightly above the end of the hose to lessen the likelihood of running the pump dry.

Wire (30) has its stripped end (33), termed the "upper probe", located above the lower probe (35), defining the water level at which the pump (17) will be activated. In a preferred embodiment, the upper probe (33) is placed one-half to one inch above the lower probe.

The wires are jacketed together (24) and run to controller (1). The water completes the sensor circuit, and is held at a positive voltage relative to the probes to provide cathodic protection.

The controller (1) includes lower (2) sensor and upper (3) sensor, logic (4), comparator (5) and timer (6) circuitry, "stop" (8) and "run" (9) testing switches (preferably momentary normally open pushbutton switches) and "Power" (10), "Pump" (11) and "Wet" (7) indicator lights (these lights are preferably light-emitting diodes (LEDs), but could be incandescent lamps or other light sources).

A power supply (12), connected to an AC source (13) such as the house power, converts the house current to a low-voltage DC which powers the controller. This power supply (12) could be one of the common "brick" or "cube" supplies which have integral power plugs and DC outputs in any desired voltage range, which would allow the power source to remain at an outlet, and low-voltage "class 2" wire run to the controller (1). In addition, the source (13), powers the pump motor (16), through the normally-open contacts (15) of a relay whose coil (14) is powered by an output (37) of the controller (1). Alternatively, in place of relay control, the pump could be controlled by an SCR or triac. If the pump motor is DC-powered, the driver transistor can directly supply the pump motor.

If desired, the pump motor (16) could be chosen to be a DC-powered motor, in which case the DC supply (12) could either power both the controller and the pump, directly, or, preferably, could be used to charge a battery which powers both the pump and the controller, giving power-failure backup capability to the system.

The wire (30) to the upper probe (33) is connected to the input of an upper sensor circuit (3). Similarly, the wire (29) from lower probe (35) is connected to the input of a lower sensor circuit (2). Each of the sensor circuits (2) and (3) sense the analog voltage present on the probes (33) and (35), and output a binary voltage (either "off" or "on") when a voltage is sensed, indicating water has reached the probe.

The sensor circuits are designed to cathodically protect the probes by keeping them negatively polarized relative to the water. The current introduced by the sensor circuits is kept low by the design of the input circuit, so as to minimize current draw through the probes and to minimize electrolytic corrosion.

The outputs of the sensor circuits (2) and (3) are connected to the logic circuitry (4). The logic circuit (4) is designed such that the pump-driver output (37) is activated when the upper sensor (3) output is "on", indicating the presence of water at the upper probe (33). The pump driver output (37) turns on relay coil (14), which pulls in contact (15), connecting pump motor (16) to the line (13), causing the pump (17) to empty the water out of hole (31). The pump driver output (37) is held active until the lower sensor (2) output is "off", indicating the water level has fallen below lower probe (35), at which point it returns to inactive state, turning off the relay (14) and thus the pump motor (16). As noted above, relay (14) could be a solid state device, such as a solid state relay, photoisolator, triac, SCR or the like, or, if the pump motor (16) is a DC motor, the pump driver output itself could power the motor without additional components.

It will be understood that in this and the following discussions, the terms "on" and "off", "active" and "inactive", are used as logic levels taken to mean whatever actual voltages or currents are chosen by the circuit designer to represent these logic levels. Various physical circuits may use differing physical voltages to represent "on", for example TTL logic ICs would use +5 V for positive logic. Other kinds of circuits might represent "on" or "active" by 0 V or −5 V (negative logic), +12 V, or the presence or absence of a given current. It is sufficient for the purposes of this description to simply indicate the logic level is "on" or "off", leaving it to the designer to choose the physical voltage or current demanded by the specific circuit designed.

In a desirable optional feature, a timer IC circuit (6) has an output connected to the "Wet" lamp (7), and an input connected to the output of the lower sensor (2), such that the "Wet" lamp (7) is lit when the lower sensor is "on". If the lower sensor is "on", a second input to the timer IC, connected to the output of the comparator (5), causes the "Wet" lamp to flash when the second input is floating, and to remain on steadily if the second input is grounded. The comparator (5) compares the analog voltage of the lower probe to a reference. The output of the comparator (5) floats if the lower probe voltage is lower than the reference, and is grounded if the lower probe voltage is higher than the reference. Thus, if the voltage on the lower probe is positive (indicating it is in water), but is not the full voltage expected (because of the presence of corrosion or contamination), the "Wet" lamp will flash, instead of remaining steadily "on". Since the upper probe is dry most of the time, it is not necessary to monitor the voltage on that probe, although it could be done in a similar fashion if desired.

The switches (8) and (9) simulate the actions of the probes, and force the controller (1) to start and stop the pump for manual control or testing. "Start" switch (9) forces the output of upper sensor (3) "on", and "stop" switch (8) similarly forces the output of lower sensor (2) "off".

Figure 6:
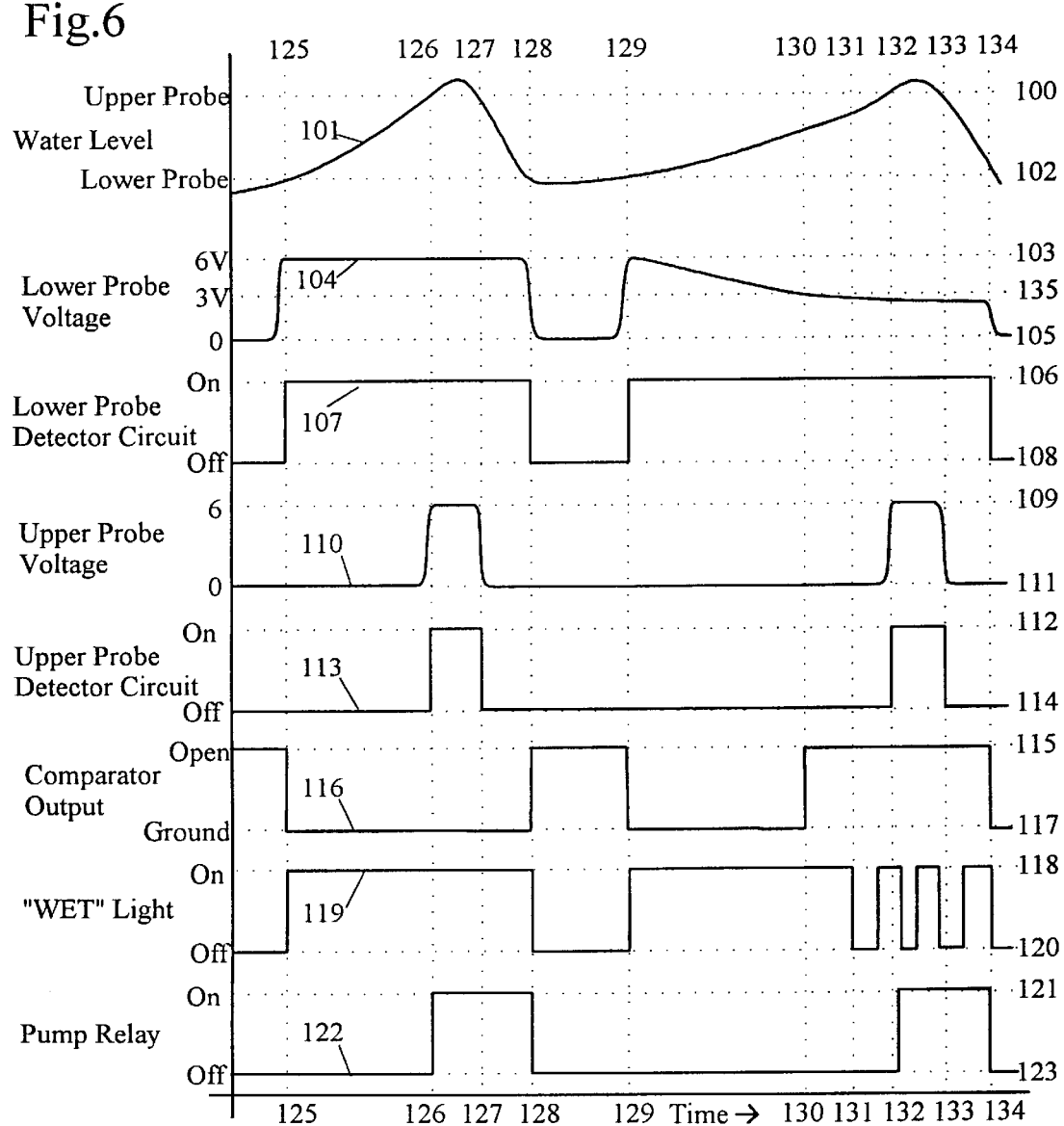
FIG. 6 shows a timing diagram of the invention in operation.

This operation can be seen in timing diagram FIG. 6. The water level (34) is represented by line (101). It is assumed for this example that water is slowly rising from its starting level. Absent the pumping, the water level would eventually rise higher than the level (100) of the upper probe.

The voltage levels on the lower probe (line (104)) and upper probe (line (110)) are arbitrarily chosen to be zero (105), (111), or floating, when the probes are dry, and +6 volts (103), (109) when the probes are wet. As discussed above, the actual voltage is not important, so long as the current is minimized and the probes are kept negative with respect to the water (or, put another way, the ground (water) has a positive polarity, relative to the probes).

As can be seen in FIG. 6, as the water (104) rises above the lower probe level (102) at time (125), the lower probe voltage (104) rises from zero to +6 volts (103). The lower probe detector circuit (lower sensor (2)) output (107) then turns "on", indicating that the lower probe is wet. Since the voltage (104) is more than the reference voltage (here given as +3 volts (135)), the output (116) of the comparator is grounded (117), and the "Wet" light (119) switches "on" (118) steadily.

At time (126), the water level (101) passes the upper probe level (100). The upper probe voltage (110) increases to +6 volts (109), and the upper probe detector circuit (upper sensor (3)) output (113) switches "on" (112). The pump relay (122) also switches "on" (121), and the pump (17) begins to pump water through the hole.

At time (127), the water level (101) falls back below the upper probe level (100). The upper probe voltage (110) falls back to zero (111), and the upper sensor output (113) switches "off" (114). The pump relay (122) remains "on", however, and the pump continues to pump water through the hole.

At time (128), the pump has pumped the water level to below the lower probe (102), and the lower probe voltage (104) drops to zero (105), as well, triggering the lower sensor output (107) to switch "off" (108). The "Wet" light (119) also switches "off" (120), and the pump relay (122) switches "off" (123) as well. The system is now quiescent, waiting for the water to rise again.

The water level (104) begins to rise once more, as water continues to seep in. Assume, now, that for some reason as the water rises, the lower probe becomes contaminated. At time (129), the water level (101) rises past the lower sensor level (102). The lower probe voltage (104) would rise to +6 volts, but because of contamination, the voltage drops due to increased resistance.

At time (130), the lower probe voltage (104) drops slowly to below the reference level (135). The comparator output (116), which had been grounded (117) begins to rise (115). This allows the timer (6) to cycle, and the "Wet" lamp flashes "on" (118) and "off" (120). This flashing alerts the homeowner to pull the probes out of the hold and wipe the contamination off.

As can be seen from the remainder of FIG. 6, so long as the voltage on the lower probe remains high enough for the sensor to detect, the remainder of the operation is the same as described above.

Figure 3:
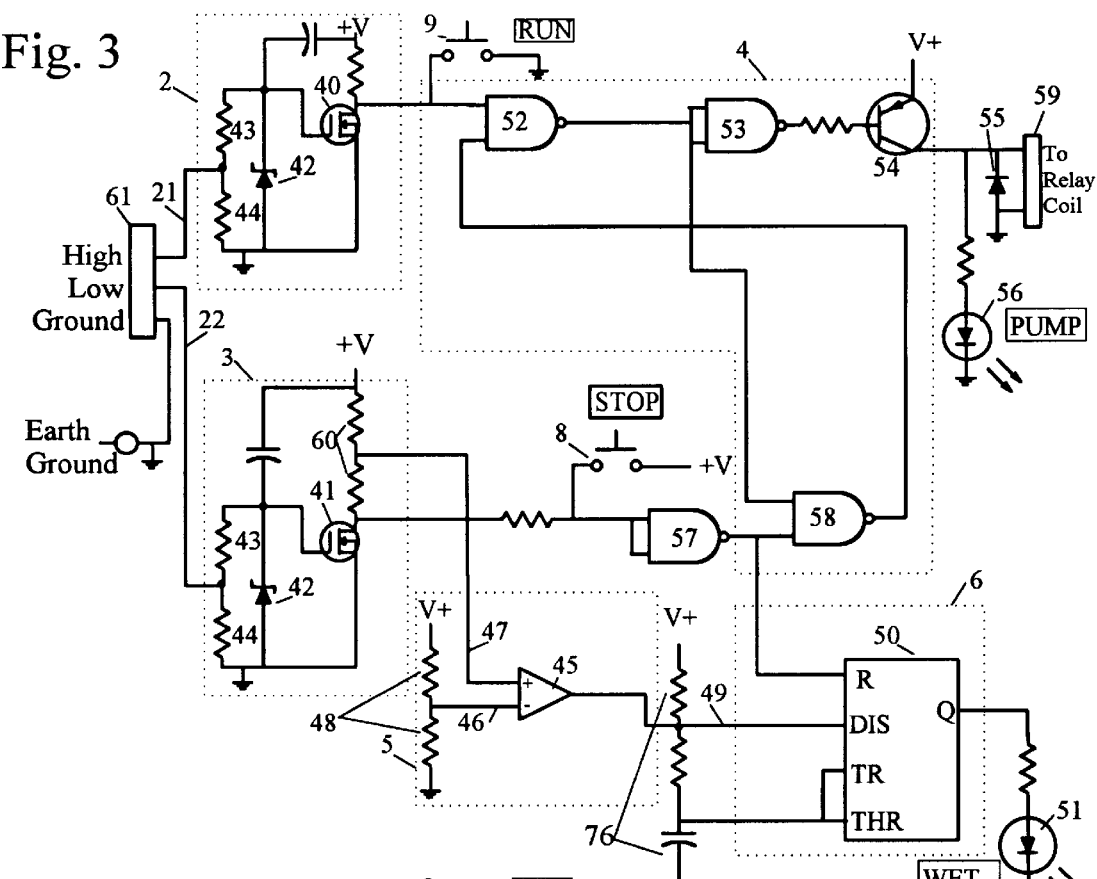
FIG. 3 shows a circuit diagram of a preferred embodiment of the controller of the invention, using MOSFET sensor circuitry.
Figure 4:
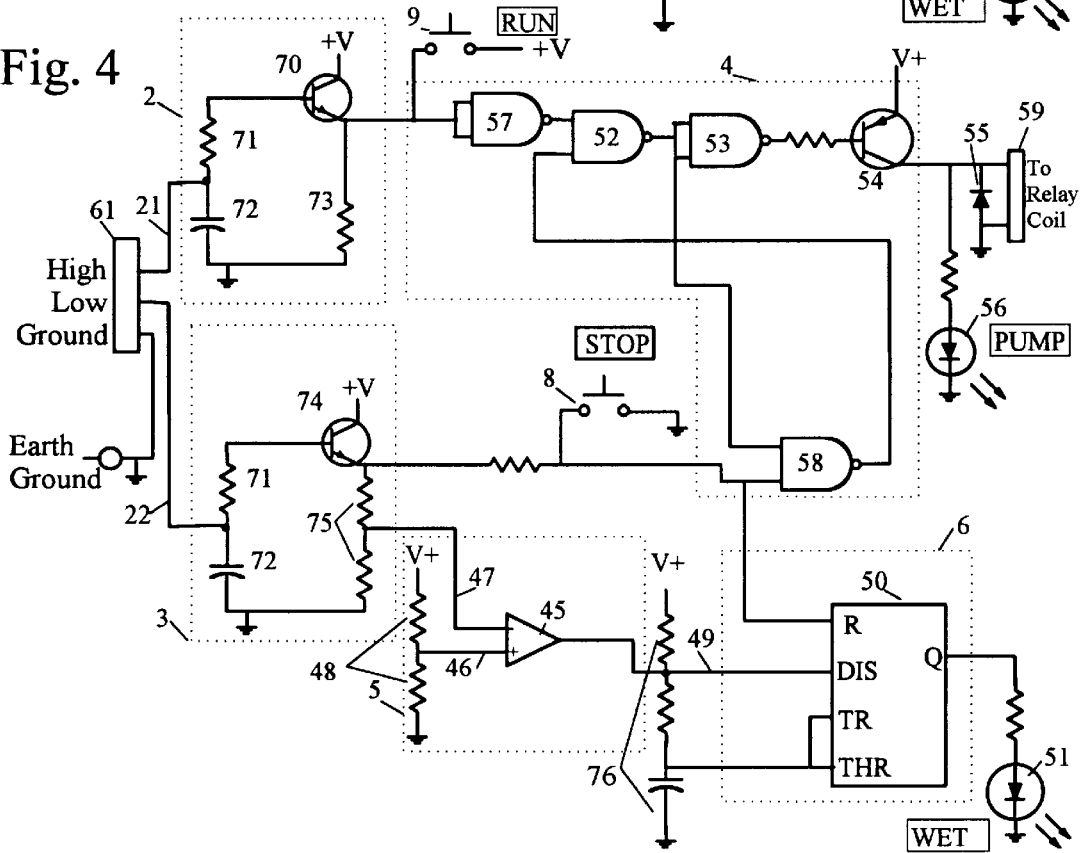
FIG. 4 shows a circuit diagram of another embodiment of the controller of the invention, using bipolar sensor circuitry.

FIGS. 3 and 4 show two alternate schematics for the invention, differing primarily in the electronic devices chosen for the upper (2) and lower (3) sensor circuits—FIG. 3 showing the use of MOSFET devices, and FIG. 4 using bipolar transistors. In both figures, dotted lines show the blocks of schematic which correspond to the similarly numbered blocks in the block diagram of FIG. 1.

It will be understood by those skilled in the art that these schematics are simplified in the interest of clarity. Conventional details are omitted—for example, the power connections to the various IC's are not shown, bypass capacitors might be omitted in some cases, and so on. The power supply is simply shown as "+V", as the exact voltages will differ within the teachings of the invention and the exact components selected.

Starting with FIG. 3, it can be seen that the preferred embodiment for the input sensor circuits (2) and (3) are MOSFET transistors (40) and (41). MOSFETs are desirable for this application because of their low current drain from the probes, which helps minimize corrosion. The IRF510 MOSFET, manufactured by International Rectifier, would be an appropriate choice of device for this circuit. A current drain as low as one microampere (1 $\mu$A) could be expected with the circuit shown.

The probes are connected to the sensor circuits through an appropriate connector (61), and wiring (21) and (22). If used, the ground probe would also connect through connector (61), or an earth ground could be connected in place of or in addition to the ground probe.

The voltage from the upper and lower probes is delivered to the MOSFET gate through a voltage divider comprising resistors (43) and (44) which reduces the probe voltage to one appropriate to the sensor device—for IRF510 FETs, with a 12 V power source divided (as noted in the discussion of FIG. 5, below) to +6 V ground, values of 560K for resistor (43) and 2.2K for resistor (44) would be desirable. A Zener diode (42) can be provided between the MOSFET gate and ground, for static and reverse-polarity protection. The output of this sensor circuit is 0 when the associated probe is wet (conducting), and high when the probe is dry (not conducting).

The output of the upper probe sensor (the drain of MOSFET (40)) is one input to NAND gate (52). If desired, a momentary pushbutton switch (9) can be connected to the same point, to force a "ground" on this line, simulating a wet upper probe and thus forcing the pump on for manual operation. A NAND gate output is "off" when both inputs are "on", and "on" otherwise. The NAND gate is preferably one section of a quad two-input NAND gate such as a standard 4011 CMOS Integrated Circuit available from many manufacturers. Alternatively, one section of a 7400 TTL quad NAND gate could be used. Many other equivalents are available in other logic series.

The output of NAND gate (52) is fed to the inputs of NAND gate (53), which has both inputs wired together so as to act as an inverter. The output of NAND/inverter (53) is connected to the base of a driver transistor (54) which is used to drive the pump control relay (59). This transistor can be any convenient type which will handle the current and voltage required by the relay (59), such as a TIP-42 general purpose PNP power transistor. Conventionally, the relay coil (59) is bypassed by a diode (55). Light-emitting diode (56) is provided across the coil (59) to provide an indication that the pump relay (and hence the pump) is on.

It should be noted here that the TIP-42 power transistor (54) could be used to directly power a DC pump, for example a solid state plunger pump developed for automotive fuel pumping, or other 12 volt DC water pump, eliminating the need for relay 59). Also, as mentioned above, the relay (59) could be a solid-state device such as a solid state relay, photoisolator, SCR, triac or other similar device, within the teachings of the invention.

The lower probe sensor circuit (3) is similar to that of the upper probe sensor (2). The output (drain) of FET (41) is connected to the connected-together inputs of NAND gate (57), being used as an inverter (again, this NAND gate/inverter is preferably one of the gates in a quad package). As in the upper probe sensor, a momentary pushbutton switch (8) can be provided at this point to simulate a dry lower probe, forcing the pump off, if it had previously been started by the "run" switch (9).

The output of the NAND/inverter (57) drives one input of NAND gate (58), whose other input is connected to the output of NAND (52). The output of NAND (58) is connected to the second input of NAND (52). The effect of this connection is to produce a latching function—when both probes are wet, the pump is activated, and remains activated until the lower probe is no longer wet (output of sensor (3) is no longer at ground).

Another, optional, feature is shown in the schematic, that of detecting corrosion or contamination of the lower probe. Another output of lower probe sensor (3), from voltage divider formed by resistors (60), provides a sample of the lower probe voltage to one input (47) of a comparator (45), which may be an LM311 type, available from many manufacturers.

The other input (46) of the comparator (45) is supplied with a reference voltage selected by voltage divider (48). The exact values of the resistors in the divider will be chosen based on the reference voltage, in a manner well known to the art. For example, if a reference voltage of +2 volts is selected, and the supply voltage is +12 V, values of 18K for the upper resistor and 3K for the lower would be chosen. The output of the comparator (45) is grounded, so long as the sampled lower probe voltage is higher than the reference voltage, and floats when the sampled lower probe voltage is lower than the reference voltage.

The output of the comparator (45) is connected to the DIS(charge) input of timer/oscillator IC (50). A standard 555 timer IC, available from many manufacturers, is preferred for this application.

The Reset input of the IC is connected to the output of NAND/inverter (57), so that if the lower probe is wet, the output of inverter (57) is high, and the output (Q) of the timer is also high, turning on "WET" LED (51). If the Reset input is low, the output (Q) is held low, as well, and the LED (51) is off.

The effect of the comparator (45) output on the DIScharge input of the timer (50) is to prevent the timer from cycling when the comparator (45) output is low. When the comparator output is floating, the timer is permitted to cycle, and the LED (51) flashes, with the flash rate being determined by the values of resistor/capacitor (76). The determination of the values of resistor/capacitor (76) would be given in the specifications for timer (50). For a 555 timer, a resistor of 510K between DIS and THR, and a capacitor of 1 µf, with a 5.1K resistor to +V, gives a flash rate of twice per second. This gives a visual indication that the lower probe has become corroded or contaminated.

FIG. 4 shows an alternative embodiment of the invention, using bipolar transistors (70) and (74) in place of MOSFETs (40) and (41), respectively. The commonly available 2N2222 NPN silicon transistors would work well in this application. Bipolar transistors are less expensive than MOSFETs, and less static sensitive (thus permitting the omission of Zener diodes (42), a further cost saving). On the other hand, the bipolar transistor configuration of FIG. 4 requires slightly more probe current, with a slight increase in corrosion potential in the long term.

Because the bipolar transistors in FIG. 4 work essentially backwards from the MOSFETs, the exact arrangement of the NAND/inverter gates need to be rearranged from the MOSFET circuit shown in FIG. 3, and the inverting and non-inverting inputs of the comparator are reversed, but the operation of the circuit as a whole remains the same.

Figure 5:
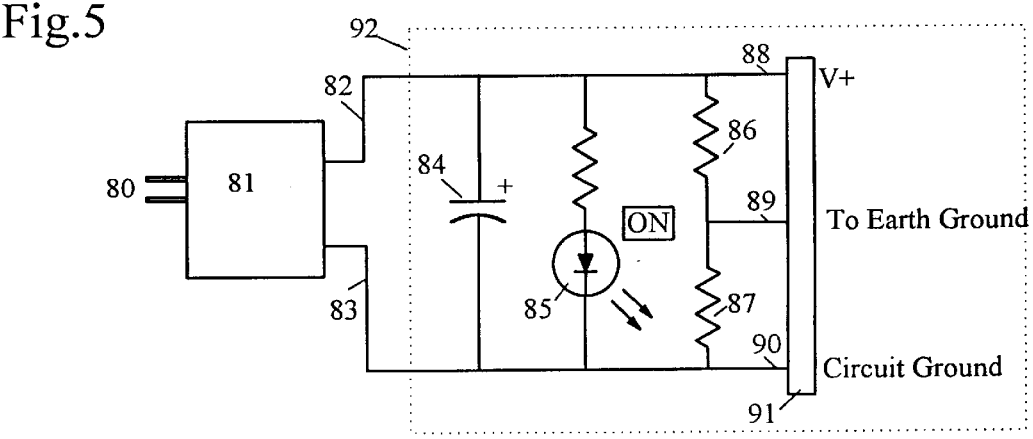
FIG. 5 shows a circuit diagram of a power-supply arrangement, suitable for use with the invention.

FIG. 5 shows a detail of a power-supply connection which might be used with the invention. A conventional "brick" supply (81) with integral plugs (80) can be used to convert the line voltage into low-voltage DC, preferably 12 volts for compatibility with standard circuits. The positive supply is at (82), negative at (83). This low voltage can be used with "Class 2 wiring", meaning that the "brick" can be plugged in anywhere convenient, and thin, flexible wire run to the controller, mounted near the pump. Dotted lines (92) indicate which components are likely to be mounted within the controller case.

An electrolytic capacitor (84), preferably of 10 µf or more, can provide a measure of filtering against noise. LED (85), across the supply voltage, is the "Power ON" indicator (light (10) in FIG. 1), indicating the presence of the supply voltage between (82) and (83).

In an optional feature of the preferred embodiment, a voltage divider, made up of equal-value resistors (86) and (87) split the supply voltage in half at their midpoint (89). This midpoint voltage (+6 V, if the supply voltage is +12 V) can be the voltage applied to earth ground or the optional ground probe, with the supply minus line (83) connected to circuit ground. The effect of this arrangement is to halve the voltage on the probes, which reduces the probe current (hence corrosion) even lower.

Accordingly, it is to be understood that the embodiments of the invention herein described are merely illustrative of the application of the principles of the invention. Reference herein to details of the illustrated embodiments are not intended to limit the scope of the claims, which themselves recite those features regarded as essential to the invention.

What is claimed is:

1. A pump control device for controlling water level in a recess between a highest and a lowest desired water level by controlling a pump, comprising:
    a) an electrically conductive lower probe located in the recess at a first location representing the lowest desired water level;
    b) an electrically conductive upper probe located in the recess at a second location representing the highest desired water;
    c) a controller comprising:
        i) a ground connection having a positive voltage applied thereto, such that a positive voltage is applied to any water in the recess;
        ii) a first sensor circuit having an input coupled to the lower probe and an output having a voltage, the circuit being selected such that the voltage on the output changes from a first voltage when no voltage is detected on the input to a second voltage when a selected voltage is detected on the input indicating the presence of water on the lower probe, the input of the first sensor circuit being selected such that the current through the probe is small when the probe is in water;
        iii) a second sensor circuit having an input coupled to the upper probe and an output having a voltage, the circuit being selected such that the voltage on the output changes from a first voltage when no voltage is detected on the input to a second voltage when a selected voltage is detected on the input indicating the presence of water at the upper probe, the input of the first sensor circuit being selected such that the current through the probe is small when the probe is in water;
        iv) a logic circuit having a first input coupled to the output of the first sensor circuit and a second input coupled to the output of the second sensor circuit, and an output having a voltage, the circuit being selected such that the voltage on the output is initially at a first voltage level, switches to a second voltage level when the output of the second sensor circuit changes to the second voltage, and remains in the second voltage level until the output of the first sensor circuit changes from the second voltage to the first voltage;
        v) a pump control output, having an input coupled to the output of the logic circuit, and an output for controlling a pump, such that the pump is turned on when the output of the logic circuit is at the second voltage, and is off when the output of the logic circuit is at the first voltage;
    the input to the first sensor circuit and input to the second sensor circuit of the controller being at a voltage which is lower than the positive voltage applied to the ground connection, such that the upper probe and lower probe are kept at a negative voltage relative to the water.

2. The pump control device of claim 1, in which the ground connection is an electrically conductive third probe, located in the recess at a position lower than the lower probe.

3. The pump control device of claim 1, in which the ground connection is an earth ground.

4. The pump control device of claim 1 in which the first sensor circuit and second sensor circuit comprise bipolar transistors.

5. The pump control device of claim 1, further comprising an indicator light coupled to the output of the first sensor circuit.

6. The pump control device of claim 1, in which the first sensor circuit and second sensor circuit comprise field effect transistors.

7. The pump control device of claim 6 in which the field effect transistors are MOSFET devices.

8. The pump control device of claim 1, in which the controller further comprises a detection circuit comprising:
- a voltage reference having an output voltage, selected to be negative relative to the voltage applied to the ground connection and positive relative to the voltage on the input to the first sensor circuit;
- a comparator having a first input coupled to the lower probe and a second input coupled to the voltage reference output voltage, and an output, the output changing from a first state when the voltage on the lower probe is greater than the voltage reference output voltage to a second state when the voltage on the lower probe is less than the voltage reference output voltage;
- an indicator driver circuit coupled to an indicator, having an input coupled to the output of the comparator such that the indicator is driven to give a preselected indication when the output of the comparator is in the second state.

9. The pump control device of claim 8, in which the indicator driver circuit comprises a timer, the indicator comprises a light, and the preselected indication is the flashing of the light.

10. The pump control device of claim 9, in which the timer further comprises a second input coupled to the output of the first sensor circuit, and the output of the timer turns the light on when the output of the first sensor circuit indicates the lower probe is in the water, and the timer causes the light to flash when the output of the comparator is in the second state.

11. The pump control device of claim 1, in which the recess is a hole drilled in a basement floor.

12. The pump control device of claim 11, in which the pump has an input hose inserted in the hole.

13. The pump control device of claim 12, in which the upper probe and lower probe are the stripped ends of wires attached to the hose.

* * * * *